United States Patent [19]

Morrison

[11] 3,744,787

[45] July 10, 1973

[54] GRIPPER JAW INSERT MISTAKE DETECTOR

[75] Inventor: Wilbur J. Morrison, Nazareth, Pa.

[73] Assignee: Bell and Howell Company, Chicago, Ill.

[22] Filed: Aug. 11, 1970

[21] Appl. No.: 62,912

[52] U.S. Cl. .................... 270/56, 270/57, 271/57
[51] Int. Cl. .................................................. B65h 43/02
[58] Field of Search .................... 270/55, 56, 57; 271/56, 57

[56] References Cited
UNITED STATES PATENTS

| 1,023,568 | 4/1912 | Juengst ............................ 270/56 |
| 2,643,113 | 6/1953 | Williams .......................... 270/56 |
| 3,191,925 | 6/1965 | McCain et al. .................. 270/56 |
| 2,949,293 | 8/1960 | Fields et al. .................... 270/56 |
| 2,711,896 | 6/1955 | Kleineberg et al. ............ 270/56 |
| 2,801,846 | 8/1957 | Stoothoff et al. ............... 270/56 |

FOREIGN PATENTS OR APPLICATIONS 58,098   8/1969   Germany ........................... 270/56

Primary Examiner—Robert W. Michell
Assistant Examiner—L. R. Oremland
Attorney—Griffin Branigan and Kindness

[57] ABSTRACT

A device is disclosed for detecting "double-or-miss" mistakes of an inserting machine. The device is made up of the inserting machine's gripper jaws, an indicator element, a linking element connecting the gripper jaws with the indicator element, and an electronic detector. The indicator element's position is determined by the extent to which the jaws are open; and a two pole electrode in the electronic detector detects the position of the indicator element.

9 Claims, 3 Drawing Figures

PATENTED JUL 10 1973

3,744,787

INVENTOR
WILBUR J. MORRISON

BY Griffin, Branigan & Kindress
ATTORNEYS

GRIPPER JAW INSERT MISTAKE DETECTOR

BACKGROUND OF THE INVENTION

This invention relates generally to the art of mail-inserting machines, used for placing inserts in envelopes. More particularly, it relates to devices which detect whether the inserting machine has missed an insert or pulled too many inserts.

Inserting machines are often used to insert pieces of material (inserts) into envelopes when the same materials are to be sent to a large number of people. For example, one type of inserting machine employs arms which insert various materials into envelopes as they are conveyed along a conveyor system. That is, one arm inserts a bill, another a promotion brochure, etc. It is important that inserting machines do not "miss" (fail to place an insert in an envelope) or "double" (place two or more inserts in one envelope). It is therefore necessary to employ devices to detect when inserting machines "miss" or "double" so that the mistakes can be corrected. There are a number of detection devices currently in use which do not perform satisfactorily at high speeds. Although prior art inserting machines have the capability of inserting over 8,500 inserts per hour, they do not operate at that speed because their mistake detectors simply are not sufficiently accurate at such high speeds.

One reason prior art insert mistake detection devices do not function well at high speeds is that they do not stabilize fast enough to get an accurate reading. That is, prior art detection devices usually have measuring calipers which close on the inserts between the time they are picked up by an inserting arm and the time they are inserted into envelopes. During operation at high speeds, the caliper jaws must close very fast on the inserts in order to complete the measurement in the allotted time. This fast closing action causes the caliper jaws to bounce away from the insert and then to close again, thus, setting up an oscillating motion which is not damped out in the allotted time. Thus, errors result. Attempts have been made to counteract this bounce by using a stronger closing force for the caliper jaws. However, the increased force tends to wrinkle the inserts and obstruct movement of the inserts toward their envelopes, especially where there is relative movement between the inserts and the caliper jaws. Hence, it is an object of this invention to provide an insert detector having caliper jaws which stabilize in the allotted time, do not use an undue closing force, and can provide an indication of not only when a mistake occurs, but whether it is a miss or a double.

Another difficulty with prior art detecting devices is that they respond differently as operating speed increases. The reason for this is that most prior art insert detectors employ undue linkage between the detector's caliper jaws and an alarm or correction element. Each linkage element has its own inertia and is consequently a source of mechanical error. At lesser speeds, the error caused by the inertia of linking parts is negligible, but as the speed of operation is increased, the error is magnified. Eventually, the error becomes significant and the detection device malfunctions. It is, therefore, another object of this invention to provide a double-or-miss insert detector which has a small number of linkage elements between the caliper and the alarm or correction device so as to reduce the error caused by the inertia of linking parts.

Still another difficulty with prior art insert detectors is that they are often located in such a position that it is difficult to observe the operation of the inserting machine. For example, many prior art insert detectors are located between an insert hopper and envelopes to be filled. This location makes it difficult to observe the inserting arms as they grab the inserts from the hopper. Also, they are in the way of someone who is adjusting or otherwise working on the machine's inserters. It is still another object of this invention to provide a double-or-miss insert detection device which does not obstruct observation or maintenance of the machine's insertion mechanism.

SUMMARY OF THE INVENTION

In accordance with principles of my invention, a gripper jaw of an inserting machine is used as a measuring caliper to measure the thickness of an insert. The gripper jaw position is transmitted through a linkage to an electrically conductive indicator element which has a unique shape for cooperating with a two pole electrode of an electrical circuit so as to close one portion of the circuit when there is a "miss" and another portion of the circuit when there is a "double".

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF A PREFERRED EMBODIMENT

Figure 1:
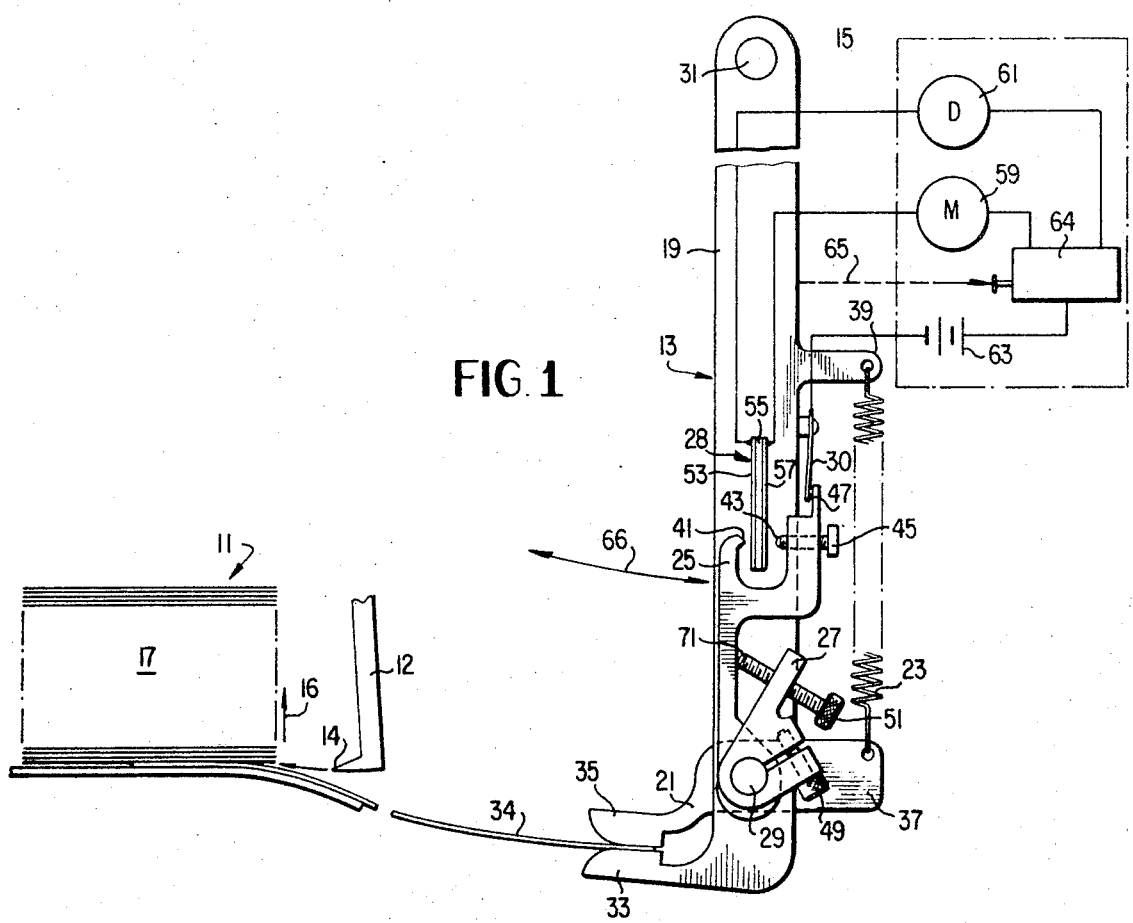
FIG. 1 is a partially schematic side elevational view of portions of a mail inserting machine embodying the invention.

Referring now to FIG. 1, a mail inserting system includes an insert hopper 11, an inserting arm assembly 13, and a mistake detection circuit 15 which is surrounded by a dashed line in the figure.

The insert hopper 11 contains a pile of inserts 17 (for example, bills) which are to be picked up by the inserting arm assembly 13. An insert separator 12 has a separating point 14 and moves as shown by arrows 16. The separating point wedges between the lowermost insert in the pile and separates that insert from the rest of the pile.

The inserting arm assembly 13 consists generally of: a gripper arm 19, a gripping jaw 21, a gripping jaw spring 23, an indicator element 25, a linking level 27, a detection terminal or electrode 28, and a circuit completion contact 30.

In the illustrated embodiment, the gripper arm 19 is made up of one solid piece of material and rotates at its upper end about a gripper arm axis 31. The lower end is crooked so as to form a lower stationary jaw 33.

The gripping jaw 21 has a gripper end 35 and a lever spring end 37 and is affixed to an axis pin 29 which is rotatably mounted on the gripper arm 19. In this regard, the gripper jaw and axis pin are adapted to rotate so that the gripper end 35 closes on the lower stationary jaw 33 and grips an insert 34 between the gripping jaw 21 and the lower stationary jaw 33. The gripping jaw spring 23 is tensioned between the lever spring end 37 of the gripping jaw and a spring stud 39 mounted on the gripping arm 19 to bias the gripping jaw 21 closed.

The indicator element 25 is electrically conductive and rotatably mounted at its lower end on the axis pin 29. Element 25 is biased by a leaf spring 30 which rotates biasing arm 47 and thereby indicator element 25 in a clockwise direction. It is significant that the indicator element 25 is not affixed to the axis pin 29, as is the gripping jaw 21, but rather, rotates about it. The upper end of the indicator element 25 has a horseshoe or "U" shape which indicates whether the jaws make a "miss" or a "double". In this regard, there is an electrical contact point on each side of the inside of the horseshoe's mouth, one being the "double" contact point 41 and the other being the "miss" contact point 43. A contact point adjusting pin 45 is mounted on one side of the horseshoe to permit adjustment of the "miss" contact point 43.

The linking lever 27 is fixedly attached to one end to the axis pin 29 by a tightening screw 49 so that the linking lever rotates with the gripping jaw 21. An adjustable linking screw 51 is mounted at the other end of the linking lever 27 for impinging on the indicator element 25 when the gripping jaw 21 and the linking lever 27 are in a certain attitude as will be explained below.

The detection terminal 28 is fixedly mounted on the gripper arm 19 and positioned in the center of the mouth of the horseshoeshaped end of the indicator element 25. The detection terminal 28 is electrically insulated from the mounting arm 19 and is made up of three elements: an electrically conductive "double" detection pole 53, an insulation layer 55 and an electrically conductive "miss" detection pole 57. The "double" and "miss" detection poles 53, 57 are positioned to make contact respectively with the "miss" and "double" contact points 41, 43, when the gripper jaw 21, the linking lever 27, and the sensing element 25 are in certain attitudes as explained below.

The mistake detection circuit 15 includes a "miss" detector 59, a "double" detector 61, a power source 63, and a detection-period switch 64. The miss and double detectors 59 and 61 are any suitable alarm or cut-off controls to indicate the commission of a corresponding mistake by the inserting machine. For example, they can be lights, buzzers, mechanisms for cutting off the inserting machine, etc. The detection-period switch 64 is closed during a "detection-period" and open at other times. In this regard, a detection period is determined by the angular location of the gripper arm. That is a linkage schematically illustrated by dashed line 65 between the detection-period switch 64 and the gripper arm enables the detection-period switch 64 to sense the angular location of the gripper arm 19. For example, in one embodiment, the detection-period switch closes its portion of the mistake detection circuitry 15 when the gripper arm 19 has rotated 20°–30° away from the hopper 11. Similarly, the linkage 65 opens the switch 64 just before the gripping jaw 21 releases the insert, approximately 160° from the hopper.

The "miss" detector 59 is electrically connected to the "miss" detection pole 57 and the "double" detector is electrically connected to the "double" detection pole 53. Both the "miss" and the "double" detectors 53 and 57 are connected through the detection-period switch 64 and the power source 63 to the indicator element 25, pin 29, gripper arm 19, and the machine frame at ground, thus forming a complete circuit whenever one of the poles contacts its respective contact point 41 or 43.

In operation, the insert separator 12 uses separating point 14 to separate the bottom insert from the rest of the pile 17 so that the gripping jaw 21 only grabs one insert. If the separator 12 separates two or more inserts from the rest of the pile, rather than one, there is a "double" because the gripping jaw picks up those inserts. If the separator 12 does not separate any inserts from the rest of the pile, there is a "miss".

Meanwhile, the gripper arm 19 rotates, as shown by arrow 66, about the gripper arm axis 31. During this period mistakes are not detected, however, because the detection-period switch 64 holds the mistake detection circuitry 15 "open". Once the gripper arm 19 has moved in a counter-clockwise direction approximately 20° – 30° from the hopper 11, however, the detection-period switch 64 closes its portion of the mistake detection circuit. As shown in FIG. 1, the inserting arm assembly 13 has just returned from the hopper 11 where it grabbed an insert 34. At this time, the detection-period switch is closed and gripping jaw spring 33 biases the gripping jaw 21 so as to hold the insert 24 firmly between the gripping jaw 21 and the lower stationary jaw 33.

The position of the linking lever 27 is determined by the position of the gripping jaw 21 because both of these members are fixedly attached to the axis pin 29. If the gripping jaw 21 has grabbed only one insert, as is the case in FIG. 1, end 71 of the adjustable linking screw 51 impinges on the indicator element 25 so that the "miss" and "double" contact points 41, 43 are held out of contact with the detection poles 53, 57. Hence, the mistake detection circuit remains open and neither of the detectors 59 or 61 are actuated.

Figure 2:
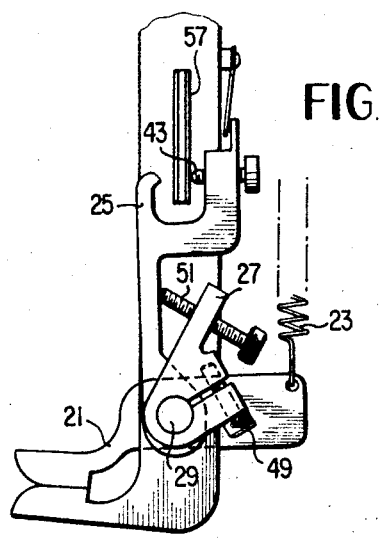
FIG. 2 is a fragmentary side elevational view of an inserting arm assembly when in the proper attitude for detecting a "miss"; and, FIG. 3 is a fragmentary side elevational view of an inserting arm assembly when in the proper attitude for detecting a "double".

FIG. 2 shows the arrangement of the detector parts when there is a "miss". Here it can be seen that the gripping jaw 21 is in a completely closed position, thus, causing the axis pin 29 and linking lever 27 to be rotated further in a counter-clockwise direction than in FIG. 1. As the gripping jaw 21 closes, the linking screw 51 impinges on the indicator element 25 forcing it to the left in FIG. 2 until the "miss" contact point 43 on the indicator element 25 contacts the "miss" detection pole 57. This completes the circuit through the miss detector 59 (FIG. 1) which registers that there was a "miss".

Figure 3:
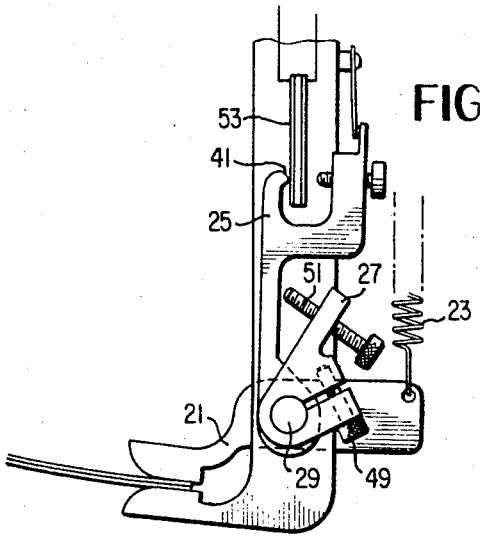

FIG. 3 shows the detector when there is a "double". Here, the gripping jaw 21 and the linking lever 27 are rotated further in a clockwise direction than in FIG. 1 because the double inserts hold the gripping jaw 21 wider open than a single insert. The linking screw 51 is, either just in contact with or pulled away from the indicator element 25 thus allowing the indicator element's bias to urge the indicator element 25 to the right in FIG. 3 until the "double" contact point 41 contacts the "double" detection pole 53. This completes the circuit through the "double" detector 61 (FIG. 1) which registers that a "double" has been made.

It can be appreciated by those skilled in the art that the linking lever 27 can be clamped to axis pin 29 at any convenient location using the tightening screw 49. Hence, adjustment for various sizes of inserts can be made by using the tightening screw 49, the linking screw 51, and the contact point adjusting screw 45. Similarly, the above described structure uses the gripping jaw of an inserting machine as a mistake-detection measuring caliper, thus, making an additional caliper unnecessary. Moreover, the gripping jaw has more time to stabilize than additional calipers because the gripping jaw is closed on the insert during the entire trip from the hopper to the envelope whereas additional calipers are not.

In addition, the inclusion of the detection-period switch makes it possible to wait until the gripper arm has rotated a full 30° or so from the hopper before an error signal is produced, thereby allowing sufficient time for the jaws to stabilize on the insert; and, it will of course be appreciated that the double pole terminal 28 permits the device to detect not only when an error occurs, but whether it is a miss or a double so that the machine operator knows what kind of corrective action to take.

Also, in the illustrated invention there is very little linkage between the gripping jaw 21 and the indicator element 25, hence, reducing the high speed errors caused by inertia.

Further, the miss-or-double detector of the invention does not obstruct the area between the hopper and the envelope conveyor because it is mounted directly on the gripper arm 19. In addition, the tightening screw 49, the linking screw 51, and the contact adjusting pin 45 are all easily accessible for adjustment.

While the invention has been particularly shown and described with reference to a preferred embodiment, it will be understood by those skilled in the art that various changes in form and detail may be made therein without departing from the spirit and scope of the invention. For example, the double pole electrode could consist of electrical element other than contacts. For example, they could be photocells, proximity switches, etc.

The embodiments of the invention in which an exclusive property or privilege is claimed are defined as follows:

1. A mistake detecting gripper jaw inserting device comprising:
   a gripper arm suitable for clockwise and counterclockwise rotation about one end to and from an insert pickup position, the other end of said gripper arm forming one portion of a gripper jaw suitable for gripping inserts;
   a shaft rotatably mounted in said gripper arm adjacent to said end forming said gripper jaw;
   a gripping jaw affixed to said shaft so as to form the other portion of said gripper jaw, the rotation of said gripping jaw with respect to said gripper arm forming a separation therebetween suitable for gripping inserts;
   a movable indicator element pivotally mounted on said shaft so as to be movable between two extreme positions, one of said extreme positions indicating that the size of said separation is below a predetermined size and the other of said extreme positions indicating that the size of said separation is beyond a predetermined size;
   a linking lever fixedly mounted on said shaft so as to coact with and control the movement of said indicator element between said two extreme positions as the separation between the portions of said gripper jaw changes; and,
   an electronic detection means for detecting and indicating the position of said movable element, said electronic detection means including a detecting element mounted on said gripper arm so as to be impinged upon by said movable indicator element, said movable indicator element impinging on said detecting element only when said movable indicator element is in one of said two extreme positions, said impingement causing said electronic detection means to indicate that no inserts or an erroneous number of inserts have been gripped.

2. A mistake detecting gripper jaw inserting device as claimed in claim 1 wherein:
   said detecting element is a double pole terminal comprising first and second electrical contact regions separated by an insulating region; and,
   said movable indicator element includes first and second electrical contact points located such that said first electrical contact point is in contact with said first electrical contact region when said movable indicator element is in one of said two extreme positions and said second electrical contact point is in contact with said second electrical contact region when said movable indicator element is in the other of said two extreme positions, either of said contacting positions creating a completed electrical circuit which causes said electronic detection means to indicate that no inserts or an erroneous number of inserts have been gripped.

3. A mistake detecting gripper jaw inserting device as claimed in claim 2 wherein said electronic detection means also includes a detection period switch electrically connected in series with said first and second electrical contact regions, said detection period switch being mounted in a manner such that said detection period switch is closed when said gripper arm is in a predetermined portion of the arc formed by its clockwise and counter clockwise rotation to and from said insert pickup position, closure of said detection period switch causing said electronic detection means to indicate that no inserts or an erroneous number of inserts have been gripped if contact is occurring between one of said electrical contact regions forming a part of said double pole terminal and one of said electrical contact points forming part of said movable indicator element.

4. A mistake detecting gripper jaw inserting device as claimed in claim 3 including adjusting means for adjusting the position of said movable indicator element with respect to the electrical contact regions of said double pole terminal so that said mistake detecting gripper jaw inserting device can be utilized over a range of insert thicknesses.

5. A mistake detecting gripper jaw inserting device as claimed in claim 4 wherein said adjusting means comprises:
   a contact point adjusting means mounted on said movable indicator arm for adjusting said first electrical contact point with respect to said first electrical contact region; and a linkage adjusting means mounted on said linking lever so as to coact with said movable indicator element for adjusting the location of said second electrical contact point with respect to said second electrical contact region.

6. A mistake detecting gripper jaw inserting device as claimed in claim 5 wherein said linkage adjusting means includes a screw movable through said linking lever and impinging on said movable indicator element so as to change the relative position of said gripping jaw with respect to said movable indicator element.

7. A mistake detecting gripper jaw inserting device as claimed in claim 1 wherein said electronic detection means also includes a detection period switch mounted in a manner such that said detection period switch is closed when said gripper arm is in a predetermined portion of the arc formed by its clockwise and counter clockwise rotation to and from said insert pickup position, closure of said detection period switch causing said electronic detection means to indicate that no inserts or an erroneous number of inserts have been gripped if contact is occurring between said movable indicator element and said detecting element.

8. A mistake detecting gripper jaw inserting device as claimed in claim 7 including adjusting means for adjusting the position of said movable indicator element with respect to said detecting element so that said mistake detecting gripper jaw inserting device can be utilized over a range of insert thicknesses.

9. A mistake detecting gripper jaw inserting device as claimed in claim 1 including adjusting means for adjusting the position of said movable indicator element with respect to said detecting element so that said mistake detecting gripper jaw inserting device can be utilized over a range of insert thicknesses.

* * * * *